(12) United States Patent
Chen et al.

(10) Patent No.: US 8,244,671 B2
(45) Date of Patent: Aug. 14, 2012

(54) REPLICA PLACEMENT AND REPAIR STRATEGIES IN MULTINODE STORAGE SYSTEMS

(75) Inventors: Ming Chen, Beijing (CN); Wei Chen, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 11/871,101

(22) Filed: Oct. 11, 2007

(65) Prior Publication Data

US 2009/0100108 A1 Apr. 16, 2009

(51) Int. Cl.
*G06F 17/30* (2006.01)
(52) U.S. Cl. .................. 707/610; 370/255; 709/201
(58) Field of Classification Search .................. 707/200, 707/610; 709/201; 370/255
See application file for complete search history.

(56) References Cited

U.S. PATENT DOCUMENTS

| | | | |
|---|---|---|---|
| 5,559,764 A | 9/1996 | Chen et al. | |
| 6,643,795 B1 | 11/2003 | Sicola et al. | |
| 6,651,137 B2 | 11/2003 | Baek et al. | |
| 6,792,472 B1 | 9/2004 | Otterness et al. | |
| 6,868,506 B2 | 3/2005 | Gagne et al. | |
| 7,024,580 B2 * | 4/2006 | Guimbellot et al. | 714/1 |
| 7,032,090 B2 | 4/2006 | Hulsey | |
| 7,039,827 B2 | 5/2006 | Meyer et al. | |
| 7,103,796 B1 | 9/2006 | Kekre et al. | |
| 7,143,120 B2 | 11/2006 | Oks et al. | |
| 7,149,787 B1 | 12/2006 | Mutalik et al. | |
| 7,159,150 B2 | 1/2007 | Kenchammana-Hosekote et al. | |
| 7,284,146 B2 * | 10/2007 | Guimbellot et al. | 714/1 |
| 7,346,734 B2 | 3/2008 | Chen et al. | |
| 7,363,528 B2 * | 4/2008 | Chan et al. | 714/4 |
| 2003/0182599 A1 * | 9/2003 | Gray et al. | 714/41 |
| 2003/0188114 A1 | 10/2003 | Lubbers et al. | |
| 2006/0047776 A1 | 3/2006 | Chieng et al. | |
| 2006/0179061 A1 | 8/2006 | D'Souza et al. | |
| 2006/0179383 A1 | 8/2006 | Blass et al. | |
| 2006/0271547 A1 | 11/2006 | Chen et al. | |
| 2007/0027916 A1 * | 2/2007 | Chen et al. | 707/104.1 |
| 2007/0038682 A1 | 2/2007 | Kulesza et al. | |
| 2008/0140734 A1 * | 6/2008 | Wagner | 707/202 |

OTHER PUBLICATIONS

Article entitled "An Analytical Framework and Its Applications for Studying Brick Storage Reliability", dated Aug. 18, 2007, by Chen et al.*
Article entitled "On the Impact of Replica Placement to the Reliability of Distributed Brick Storage Systems" by Lian et al. dated Jun. 2005.*
Article entitled "Efficient Reliable Internet Storage" by Van Renesse dated 2004.*
Article entitled "Research" by Microsoft dated Aug. 18, 2007.*
Article entitled "Proactive Replication for Data Durability" dated 2006 by Sit et al.*

(Continued)

*Primary Examiner* — Mahesh Dwivedi
(74) *Attorney, Agent, or Firm* — Lee & Hayes, PLLC

(57) ABSTRACT

A multimode storage system uses a global-placement and local-repair strategy for replica placement and repair of data objects. The data objects are initially placed randomly throughout the storage system, while the subsequent replacement replicas of any lost data objects are placed non-globally, for example within the same cluster as the repair source. This approach aggregates the bandwidth of all leaf switches/routers for repair and thus improves data repair bandwidth and repair speed. The approach also reserves more root switch bandwidth for tasks such as data rebalance, a process migrating data to the new nodes that have replaced failed ones.

19 Claims, 6 Drawing Sheets

OTHER PUBLICATIONS

Abd-El-Malek, et al., "Ursa Minor: Versatile Cluster-Based Storage", available at least as early as Jul. 9, 2007, at 21 <http://citeseer.ist.psu.edu/cache/papers/cs2/176/http;zSzwww.pdl.cmu.eduzSzPDL-FTPzSzSelfStarzSzursaminor-fast05.pdf/abd/abd-el-malek05ursa.pdf>>, 14 pgs.

Billinton et al., "Reliability Evaluation of Engineering System: Concepts and Techniques," Perseus Publishing, 1992, abstract, contents, and popular passages from Google Book Search, 5 pgs.

Burkhard et al., "Disk Array Storage System Reliability," in Proc. of Symposium on Fault-Tolerant Computing, 1993, 10 pgs.

Douceur et al., "Optimizing File Availability in a Secure Serverless Distributed File System," in Proc. of SRDS, 2001, 10 pgs.

Fleiner et al., "Reliability of modular mesh-connected intelligent storage brick systems," IBM J. Res. & Dev., vol. 50, No. 2/3, Mar./May 2006, pp. 199-208.

Ganger et al., "Self-* Storage: Brick-based storage with automated administration," Carnegie Mellon University Technical Report CMU-CS-03-178, Aug. 2003, pp. 1-11.

Garcia, et al., "Reliable Partial Replication of Contents in Web Clusters: Getting Storage without losing Reliability", at <<http://academypublishercom/jcp/vol01/no07/jcp01078188.pdf>>, Journal of Computers, vol. 1, No. 7, Oct./Nov. 2006, pp. 81-88.

Lian et al., "On the Impact of Replica Placement to the Reliability of Distributed Brick Storage Systems," Microsoft Research MSR-TR-2005-71; Jun. 2005, 14 pgs.

Mamat, et al., "Neighbor Replica Distribution Technique for Cluster Server Systems", at <<http://mjcs.fsktm.um.edu.my/document.aspx?FileName=305.pdf>>, Malaysian Journal of Computer Science, vol. 17, No. 2, Dec. 2004, pp. 11-20.

Ramabhadran et al., "Analysis of Long-Running Replicated Systems," in Proc. of INFOCOM, 2006, 9 pgs.

Tang, et al., "Sorrento: A Self-Organizing Storage Cluster for Parallel Data-Intensive Applications", available at least as early as Jul. 9, 2007, at <<http://www.cs.ucsb.edu/research/tech_reports/reports/2003-30.pdf>>, Univeristy of California, Santa Barbara Technical Paper, pp. 1-14.

Xin et al., "Reliability Mechanisms for Very Large Storage Systems," in Proc. of 20th IEEE/11th NASA Goddard Conference on Mass Storage Systems & Technologies, Apr. 2003, pp. 1-11.

Yu et al., "Availability of Multi-Object Operations," in Proc. of NSDI'06, May 2006, 14 pgs.

Zhang et al., "BitVault: a Highly Reliable Distributed Data Retention Platform," Technical Report MSR-TR-2005-179, Dec. 2005, pp. 1-15.

* cited by examiner

REPLICA PLACEMENT AND REPAIR STRATEGIES IN MULTINODE STORAGE SYSTEMS

RELATED APPLICATIONS

This application is related to U.S. patent application Ser. No. 11/756,183, filed on May 31, 2007, entitled "ANALYTICAL FRAMEWORK FOR MULTINODE STORAGE RELIABILITY ANALYSIS", which patent application is incorporated herein by reference.

BACKGROUND

The reliability of multinode storage systems using clustered data storage nodes has been a subject matter of both academic interests and practical significance. Among various multinode storage systems, brick storage solutions using "smart bricks" connected with a network such as Local Area Network (LAN) face a particular reliability challenge. One reason for this is because inexpensive commodity disks used in brick storage systems are typically more prone to permanent failures. Additionally, disk failures are far more frequent in large systems.

A "smart brick" or simply "brick" is essentially a stripped down computing device such as a personal computer (PC) with a processor, memory, network card, and a large disk for data storage. The smart-brick solution is cost-effective and can be scaled up to thousands of bricks. Large scale brick storage fits the requirement for storing reference data (data that are rarely changed but need to be stored for a long period of time) particularly well. As more and more information being digitized, the storage demand for documents, images, audios, videos and other reference data will soon become the dominant storage requirement for enterprises and large internet services, making brick storage systems an increasingly attractive alternative to generally more expensive Storage Area Network (SAN) solutions.

To guard against permanent loss of data, replication is often employed. The theory is that if one or more, but not all, replicas are lost due to disk failures, the remaining replicas will still be available for use to regenerate new replicas and maintain the same level of reliability. New bricks may also be added to replace failed bricks and data may be migrated from old bricks to new bricks to keep global balance among bricks. The process of regenerating lost replicas after brick failures is referred to as data repair, and the process of migrating data to the new replacement bricks is referred to as data rebalance. These two processes are the primary maintenance operations involved in a multinode storage system such as a brick storage system.

The reliability of brick storage system is influenced by many parameters and policies embedded in the above two processes. What complicates the analysis is the fact that those factors can have mutual dependencies. For instance, cheaper disks (e.g. SATA vs. SCSI) are less reliable but give more headroom of using more replicas. Larger replication degree in turn demands more switch bandwidth. Yet, a carefully designed replication strategy could avoid the burst traffic by proactively creating replicas in the background. Efficient bandwidth utilization depends on both the given (i.e. switch hierarchy) and the design (i.e. placement strategy). Object size also turns out to be a non-trivial parameter. Moreover, faster failure detection and faster replacement of failed bricks can provide better data reliability, but they incur increased system cost and operation cost.

There is therefore a need for an optimized storage system configuration having system parameters and design stratgies to balance the tradeoffs between cost, performance, and reliability.

SUMMARY

A multinode storage system using a global-placement and local-repair strategy for replica placement and repair of data objects is described. The global-placement and local-repair strategy initially places data objects randomly throughout the storage system, but places subsequent replacement or repair replicas of lost data objects non-globally, for example within the same cluster as the repair source. This approach aggregates the bandwidth of all leaf switches/routers for repair and thus improves data repair bandwidth and repair speed. The approach also reserves more root switch bandwidth for other tasks such as data rebalance, a process migrating data to the new nodes that have replaced failed ones.

At least some of replacements of lost replicas of data objects are placed using a non-global replacement policy in which each replacement is copied from a repair source of the respective lost replica and placed within a respective cluster containing the repair source. The cluster may be a local cluster directly connected to one of the leaf switches, or a higher level cluster connected to through a common intermediate (branch) switch and multiple leaf switches. In one embodiment, substantially all replacements of lost replicas of data objects are placed using the non-global replacement policy. A mixed or graduated mode of the method may also be used, in which some of replacements are placed within the same local cluster as the repair source and the rest of replacements are placed within a higher level cluster of storage units that are connected to a common intermediate (branch) switch. When the bandwidth of the root switch or router is lacking or in demand, replacements may be placed more locally.

The Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
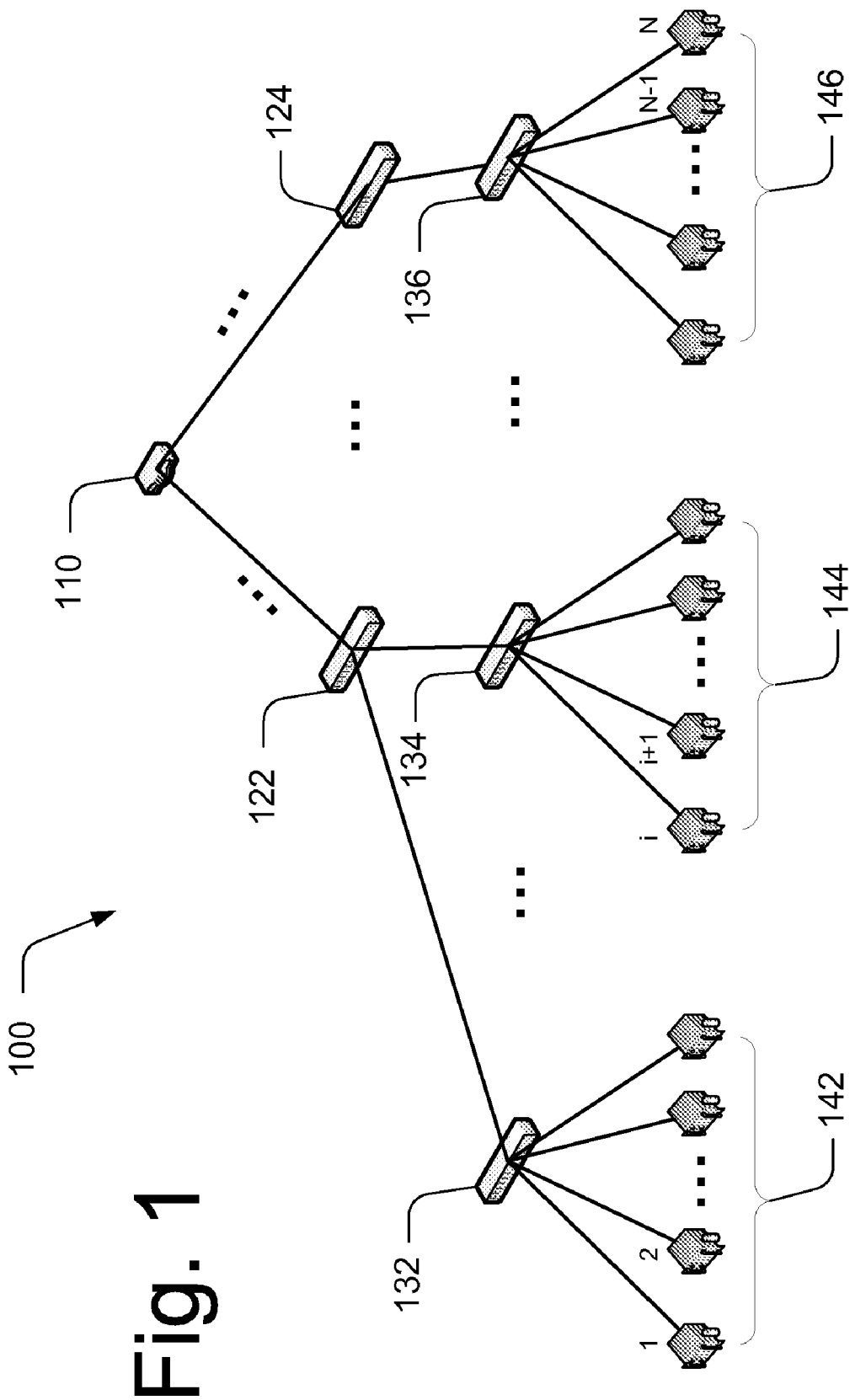
FIG. 1 shows an exemplary multinode storage system.

FIG. 1 shows an exemplary multinode storage system. The storage system 100 has a tree topology including a root switch (or router) 110, leaf switches (or routers) at different levels, such as intermediate switches 122, 124 and omitted ones therebetween at one level, and leaf switches 132, 134, 136 and omitted ones therebetween at another level.

The storage system 100 uses N storage units (1, 2, . . . i, i+1, . . . , N−1 and N) grouped into local clusters 142, 144, 146 and omitted ones therebetween. The storage units in each cluster 142, 144 and 146 are connected to a corresponding leaf switch (132, 134 and 136, respectively). Multiple clusters (e.g., clusters 142 and 144) may form a higher level cluster by sharing a common intermediate switch or branch switch (e.g., switch 122).

In one embodiment, the storage system 100 is a brick storage system in which each storage unit is a "brick", a stripped-down PC having CPU, memory, network card and one or more disks for storage, or a specially made box containing similar components. If a PC has multiple disks, the PC may be treated either as a single brick (a single storage unit) or multiple bricks (multiple storage units), depending on how the multiple disks are treated by the data object placement policy, and whether the multiple disks may be seen as different units having independent failure probabilities.

Multiple data objects are stored in the storage system 100. Each data object has a desired number of replicas stored in different bricks.

Figure 2:
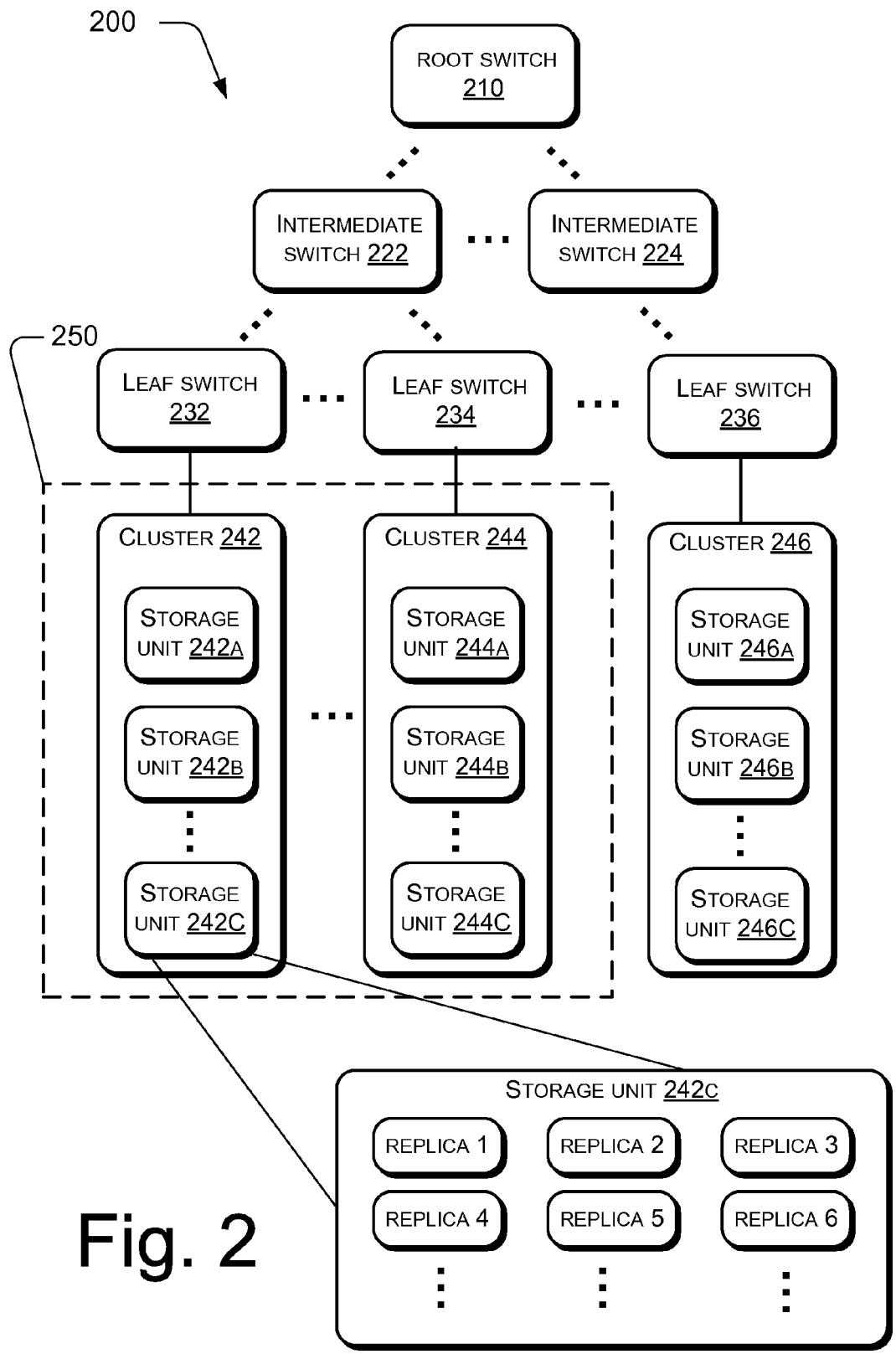
FIG. 2 shows a block illustration of an exemplary multinode storage system similar to the storage system of FIG. 1.

FIG. 2 shows a block illustration of an exemplary multinode storage system similar to the storage system of FIG. 1. The brick storage system 200 has a tree topology including a root switch 210, intermediate switches 222 and 224 and omitted ones therebetween at the same level, and leaf switches 232, 234, 236 and omitted ones therebetween at the same level. There may be multiple levels of intermediate switches between the root 210 and leaf switches 232, 234 and 236.

Each leaf switch is connected to a local cluster of storage units. For example, leaf switch 232 is connected to cluster 242 which includes multiple storage units 242A, 242B, . . . and 242C; leaf switch 234 is connected to cluster 244 which includes multiple storage units 244A, 244B, . . . and 244C; and leaf switch 236 is connected to cluster 246 which includes multiple storage units 246A, 246B, . . . and 246C.

Multiple clusters sharing a common intermediate switch may form a higher level cluster. For example, cluster 242 and cluster 244 belong to the same higher level cluster 250 as they share the same intermediate switch 222. Higher level clusters of different levels may be formed depending on the number of switch levels included. For example, higher level cluster 250 (including local clusters 242 and 244) is a first level higher level cluster if there are no intervening intermediate switches between intermediate switch 222 and leaf switches 232 and 234; or a second level higher level cluster if there is one level of intervening intermediate switches between intermediate switch 222 and leaf switches 232 and 234, and so on.

The storage system 200 is used for storing multiple (usually in large quantities) data objects. Each object has a desired number of replicas stored in different storage units. Each storage unit stores multiple replicas of data objects. In some embodiments, replicas of multiple data objects of small sizes may be grouped to form a group replica treated as a single replica by placement and replacement policies. Such grouping may help optimizing parallel bandwidth performance of local leaf switches and intermediate (branch) switches. What size of a data object may be considered as a small size may depend on the system configuration and parameters. In one embodiment, a data objects smaller than 100 MB is considered to have a small size and may be grouped.

As illustrated in FIG. 2, storage unit 242C has stored thereupon replicas 1, 2, 3, 4, 5, 6, and many other replicas not shown. In general, replicas stored on the same storage unit should preferably be that of different data objects. Having redundant replicas of the same object on the same storage unit usually is not an effective way to increase the data reliability, especially when hardware failure of storage units is a major factor contributing to data loss. This is because when a storage unit fails, all replicas stored on that storage unit are likely to be lost.

In order to increase the data independence of the replicas, in one embodiment all replicas of data objects are initially randomly placed on storage units throughout the entire storage system 200. This initial placement may be referred to as global placement.

In event of data loss, the storage system 200 makes a repair by making a replacement replica. To do this, the storage system 200 makes a replacement replica of the data object which has lost a replica. One way to do this is to make a copy of an existing replica of the same data object, and place the copy in an existing storage unit as a replacement. For example, if storage unit 242C has failed, all replicas on that storage unit are considered lost and will need to be repaired. For each replica stored on storage unit 242C, it is expected that there is at least another replica of the same data object stored in a different storage unit that has not failed. If no replica of the same data object exists in the entire storage system 200, the data object is considered to have been lost permanently.

The storage unit that contains a needed replica is used as a repair source for making a repair. Another storage unit that has spare storage space is used as a repair target to place a copy of a repair replica. The repair source may be anywhere in the storage system 200, and may or may not be in the same cluster or higher level cluster as that of the storage unit which contained the loss replica. For example, when storage unit 242C has failed, storage unit 244A may happen to have a replica identical to Replica 1 stored on storage unit 242C and can thus serve as a repair source for repairing the lost Replica 1. Different lost replicas may have different repair sources. For instance, a replica identical to Replica 2 may be found in storage unit 246B, which then serves as the repair source for Replica 2.

A non-global replacement policy is used for placing at least some of the replacement replica is. According to the non-global replacement policy, each repair replacement is copied from a repair source of the respective lost replica and placed within the repair target cluster which is the same cluster containing the repair source. The repair target cluster may be a local cluster directly connected to one of the leaf switches, or a higher level cluster connected to through a common intermediate (branch) switch and multiple leaf switches.

In one embodiment, the repair source storage unit and the repair target storage unit are in the same local cluster connected through a leaf switch (e.g. leaf switch 234). This replacement and repair policy is referred to as local replacement. As can be seen in FIG. 2, with local replacement of a lost replica, only the respective local leaf switch is used for data communication. For example, assuming storage unit 244A is the repair source for making a replacement copy of the lost Replica 1, another storage unit (e.g., storage unit 244B) in the same cluster 244 may be used as the repair target.

To perform the repair or replacement, the replica that is identical to the lost Replica 1 is identified in storage unit 244A, and a copy of the replica is made and placed in storage unit 244B. In this process, only the bandwidth of leaf switch 234 is used.

In another embodiment, the repair source storage unit and the repair target storage unit are in the same high level cluster connected to through a branch switch (e.g. intermediate switch 222). This replacement and repair policy may be referred to as a semi-local replacement or regional replacement, which is still different from the conventional global replacement. As can be seen in FIG. 2, with semi-local replacement of a lost replica, only the respective branch switch and the associated local leaf switches are used for data communication. For example, assuming storage unit 244A is the repair source for making a replacement copy of the lost Replica 1, another storage unit (e.g., storage unit 242A) in the same high level cluster 250 may be used as the repair target. To perform the repair or replacement, the replica that is identical to the lost Replica 1 is identified in storage unit 244A, and a copy of the replica is made and placed in storage unit 242A. In this process, only the bandwidths of intermediate switch 222 and leaf switches 232 and 234 are used.

In general, the lost replicas on the failed storage unit 242C may have different repair sources that spread across the storage system 200. The repair of these lost replicas therefore would therefore enlist multiple leaf switches across the storage system 200, and can be done in parallel. This has both the advantage of not occupying the limited bandwidth of the root switch 210 and the advantage of aggregating the parallel bandwidth of all leaf switches/routers for repair, and thus improves data repair bandwidth and repair speed. In comparison, in a conventional global replacement scheme, replacement happens randomly throughout the entire storage system and thus demands a bandwidth of root switch 210.

Preferably, in any extended time period of operation of the storage system 200, all replacements of lost replicas of data objects are placed using the above-described local replacement strategy, in which the repair target of every lost replica is selected to be in the same cluster as its respective repair source.

In one embodiment, however, a mixed mode is used. For example, at any given time, the lost replicas of data objects may be divided into two portions, where the first portion is replaced using the above-described non-global replacement policies while the rest (the second portion) is globally replaced. Allocation of the two portions may change from time to time depending on the circumstances, particularly the current availability of the bandwidth of root switch. For instance, the storage system 200 may be adapted for setting a percentage of all repair replacements of lost replicas are to be placed using the non-global replacement policy. The percentage may be set according to a current availability of bandwidth of the root switch and/or the intermediate switches. In general, it is preferred that more replacements are placed non-globally when the availability of the bandwidth of high-level switches or routers is less, and vice versa.

In another embodiment, a graduated mode is used. For example, a portion of the lost replicas of data objects may be repaired within the same local cluster, another portion of the lost replicas of data objects may be repaired within the same first level higher level cluster sharing a common intermediate switch at the level above the leaf switches (232, 234 and 236), yet another portion may be replaced within the same second-level cluster sharing a common intermediate switch to levels above the leaf switches, and so on. The lost replicas may be allocated among the cluster level, different higher level clusters and the global level according to the availability of the bandwidth at the different levels.

In addition, the storage system 200 may perform data rebalance from time to time or interaction to a storage unit replacement. For example, when a failed storage unit is replaced by a new storage unit, the system 200 may migrate at least some of the replicas of data objects to the new storage unit. Data rebalance may be performed on a random scheme in which replicas randomly selected throughout the entire storage system 200 are moved or copied to the new storage unit. Data rebalance may also be performed on a selective basis in which replicas systematically selected or preselected are moved or copied to the new storage unit.

The storage system may further proactively make a number of extra replicas of data objects for at least some of the data objects when storage room is available. In comparison to replacement which is performed in reaction to a loss of a replica, proactive replication of extra replicas is performed independent of such a loss of replica. Proactively made extra replicas of data objects may be randomly placed in the storage system 200.

During operation, multiple acts (including replacement, data rebalance and proactive replication as described above), if performed at the same time, compete with each other for limited bandwidth. In order to achieve a more balanced system, the storage system may allocate the bandwidth of the root switch and the intermediate switches for among replacement, data rebalance and proactive replication. For instance, a certain percentage of the bandwidth may be allocated to replacement, another percentage for data rebalance, and yet another percentage for making the extra replicas of data objects.

Reliability Analysis

The storage system and the replacement method described herein is studied using an analytical framework disclosed in U.S. patent application Ser. No. 11/756,183, filed on May 31, 2007, entitled "ANALYTICAL FRAMEWORK FOR MULTINODE STORAGE RELIABILITY ANALYSIS".

In order to analytically and quantitatively analyze the reliability of a brick storage system, the framework defines a state space of the brick storage system. Each state is described by at least two coordinates, of which one is a quantitative indication of online status of the brick storage system, and the other a quantitative indication of replica availability of an observed object.

For instance, the state space may be defined as (n, k), where n denoting the current number of online bricks, and k denoting the current number of replicas of the observed object. The framework uses a stochastic process (such as Markov process) to determine a metric measuring a transition time from a start state to an end state. The metric is used for estimating the reliability of the multinode storage system. An exemplary metric for such purpose, as illustrated below, is the mean time to data loss of the system, denoted as $MTTDL_{sys}$. After the system is loaded with desired number of replicas of the objects, $MTTDL_{sys}$ is mean expected time when the first data object is lost by the system, and is thus indicative of the reliability of the storage system.

Based on the state space, a state space transition pattern is defined and corresponding transition rates are determined. The transition rates are then used by the Markov process to determine the mean time to data loss of the storage system ($MTTDL_{sys}$).

Figure 3:
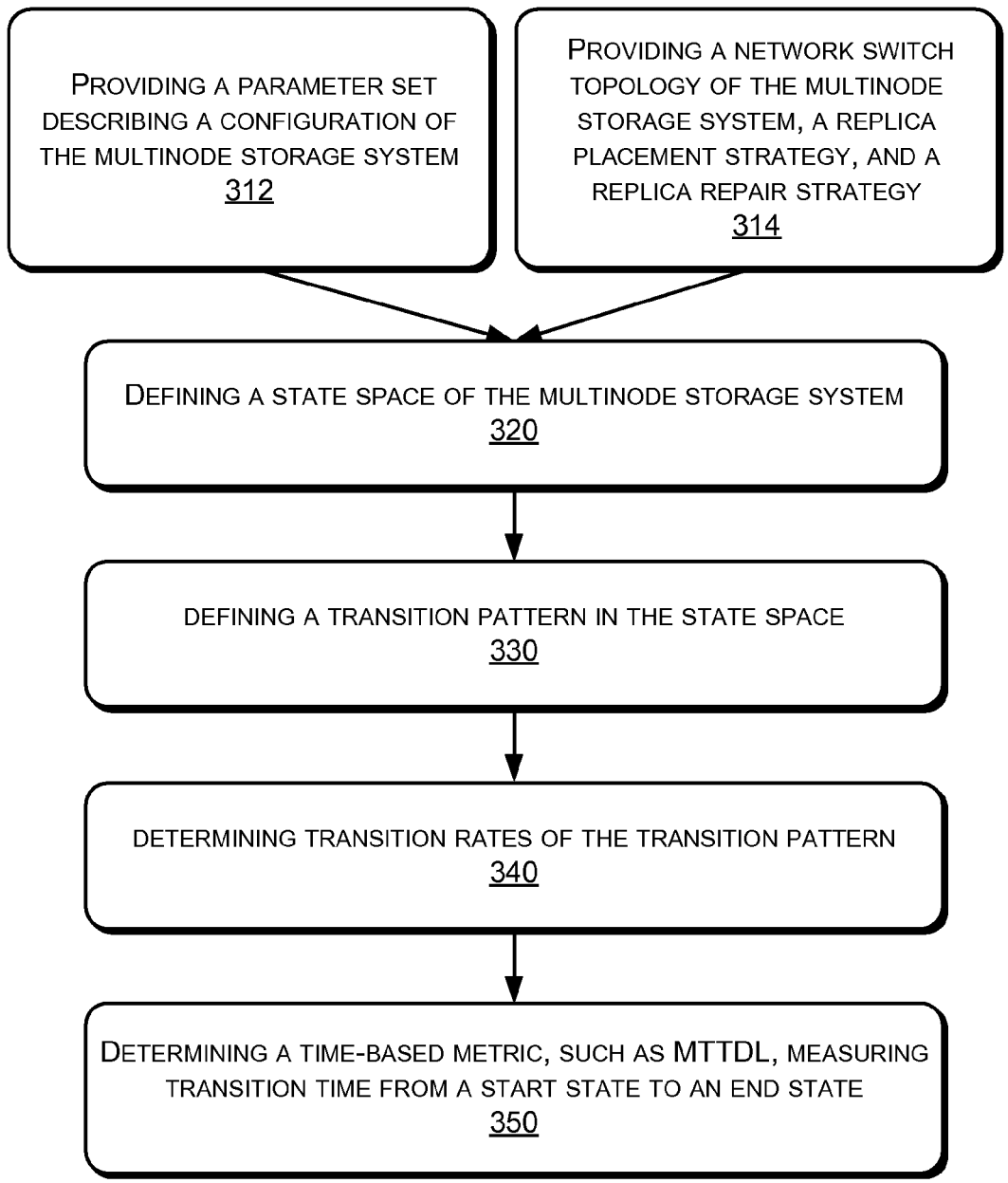
FIG. 3 is a block diagram illustrating an exemplary process for determining reliability of a multinode storage system.

FIG. 3 is a block diagram illustrating an exemplary process for determining reliability of a multinode storage system. Blocks 312 and 314 represent an input stage, in which the process provides a set of parameters describing a configuration of the multinode storage system (e.g., 100 and 200), and other input information such as network switch topology, replica placement strategy and replica repair strategy. The parameters describing the configuration of the system may include, without limitation, number of total nodes (N), failure rate of a node (λ), desired number of replicas per object (replication degree K), total amount of unique user data (D), object size (s), switch bandwidth for replica maintenance (B), node I/O bandwidth, fraction of B and b allocated for repair (p), fraction of B and b allocated for rebalance (q, which is usually 1-p), failure detection delay, and brick replacement delay. Some of the above input information is optional and may selectively provided according to the purpose of the analysis. In addition, some or all of the parameters and input information may be provided at a later stage, for example after block 340 and before block 350.

At block 320, the process defines a state space of the multinode storage system. In one embodiment, the state space is defined by (n, k) where n is the number of online nodes (bricks) and k is number of existing replicas.

At block 330, the process defines a state space transition pattern in the state space.

Figure 5:
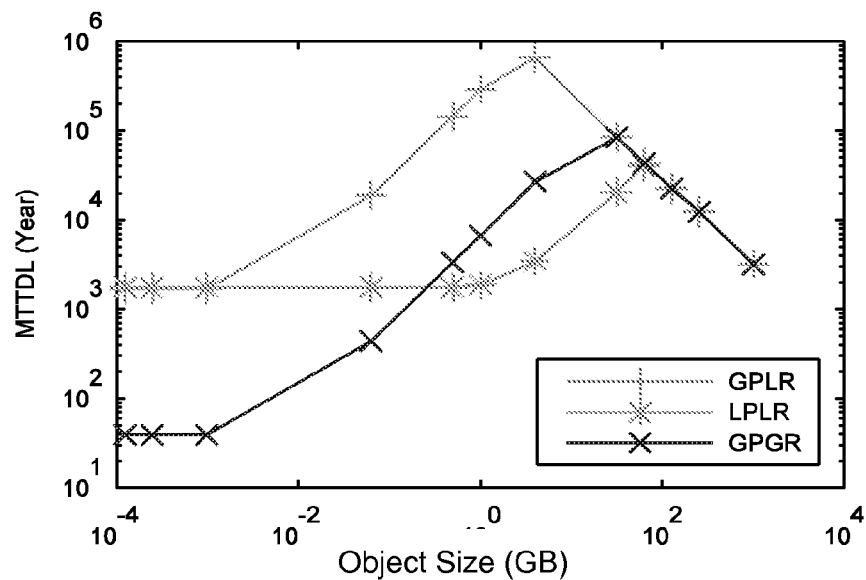
FIG. 5 is a diagram showing the reliability of the three different placement and repair strategies.

At block 340, the process determines transition rates of the state space transition pattern, as illustrated in FIG. 5 and the associated text.

At block 350, the process determines a time-based metric, such as $MTTDL_{sys}$, measuring transition time from a start state to an end state. If the start state is an initial state (N, K) and the stop state is an absorbing state (n, 0), the metric $MTTDL_{sys}$ would indicate the reliability of multinode storage system. In initial state (N, K), N is the total number of nodes, and K the desired replication degree (i.e., the desired number of replicas for an observed object). In the absorbing state (n, 0), n is the number of remaining nodes online and "0" indicates that all replicas of the observed object have been lost and the observed object is considered to be lost.

Figure 4:
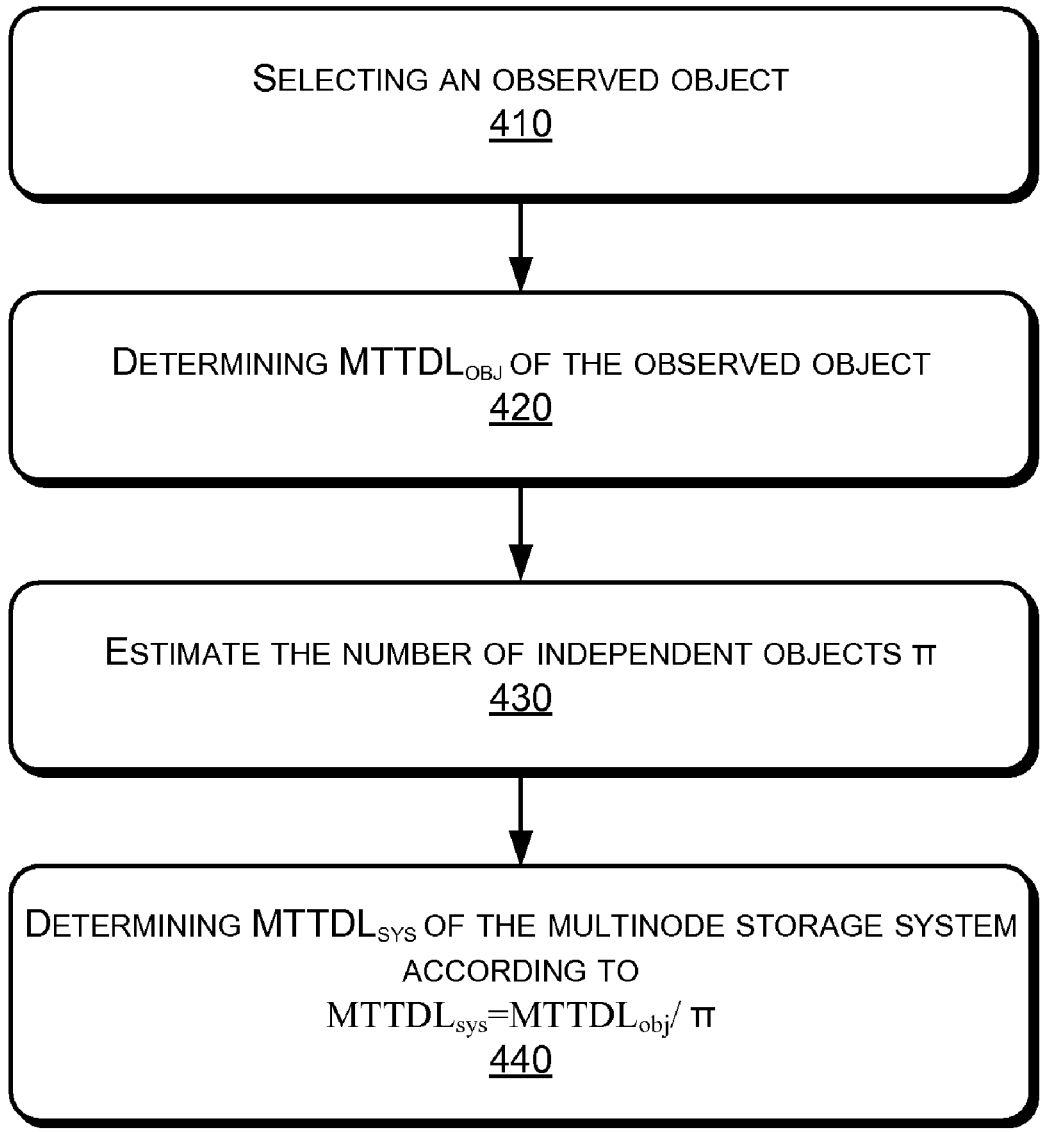
FIG. 4 shows an exemplary process for determining $MTTDL_{sys}$.

FIG. 4 shows an exemplary process for determining $MTTDL_{sys}$. In this exemplary process, $MTTDL_{sys}$ is determined in two major steps. The first step is to choose an arbitrary object (at block 410), and analyze the mean time to data loss of this particular object, denoted as $MTTDL_{obj}$ (at block 420). The second step is to estimate the number of independent objects denoted as π (at block 430), and then determine the mean time to data loss of the system is given as (at block 440):

$$MTTDL_{sys} = MTTDL_{obj}/\pi.$$

The number of independent objects π is the number of objects which are independent in terms of data loss behavior.

Exemplary methods for determining $MTTDL_{obj}$ and π are disclosed in U.S. patent application Ser. No. 11/756,183, entitled "ANALYTICAL FRAMEWORK FOR MULTINODE STORAGE RELIABILITY ANALYSIS".

The quantitative determination of the parameters of a brick storage system may be assisted by an input of the information of the storage system, such as the information of the network switch topology of the storage system, the replica placement strategy and replica repair strategy.

Various aspects of the multimodal storage system are analyzed using the analytical framework as described in the following.

Topology-Aware Placement and Repair:

A multinode storage system that is being analyzed may have a switch topology, a replica replacement strategy and a replica repair strategy which are part of the configuration of the multinode storage system. The configuration may affect the available parallel repair bandwidth and the number of independent objects, and is thus an important factor to be considered in reliability analyses. To analyze the reliability of such a multinode storage system, the analytical framework is preferably capable of properly modeling the actual storage system by taking into consideration the topology of the storage system and its replica placement and repair strategies or policies.

The analytical framework is used to analyze different placement and repair strategies that utilize a particular network switch topology. The analytical framework is able to show that some strategy has better data reliability because it increases repair bandwidth or reduces the number of independent objects.

Referring back to FIG. 1, in an exemplary application of the analytical framework, the storage system being analyzed has a typical switch topology with multiple levels of switches forming a tree topology. The set of bricks attached to the same leaf level switch are referred to as a cluster (e.g., clusters 142, 144 and 146). The traffic within a cluster only traverses through the respective leaf switch (e.g. leaf switch 132, 134 and 136), while traffic between the clusters has to traverse through parent switches such as switches 122, and 124 and the root switch 110. Given the tree topology, the following different replica placement and repair strategies, based on the choices of initial placement (where to put object replicas initially) and repair placement (where to put new object replicas during data repair) are analyzed.

Global placement with global repair (GPGR) strategy—According to GPGR strategy, both initial and repair placement are fully random across the whole system, in which case potential repair bandwidth is bounded by the root switch bandwidth.

Local placement with local repair (LPLR) strategy—According to LPLR strategy, both initial and repair placements are random within each cluster. Essentially each cluster acts as a complete system and data are partitioned among clusters. In this case, potential parallel repair bandwidth is bounded by the aggregate bandwidth of those leaf switches under which there are failed bricks.

Global placement with local repair (GPLR) strategy in accordance with the present disclosure—In GPLR, initial placement is random across the whole system, but replacement is within the same clusters as the repair source. This approach significantly improves data repair bandwidth, since it could aggregate the bandwidth of all leaf switches for repair. Data rebalance still consumes root switch bandwidth in GPLR.

The analytical framework as described in U.S. patent application Ser. No. 11/756,183 is applied to evaluate the reliability of the above three different placement and repair strategies.

FIG. 5 is a diagram showing the reliability of the three different placement and repair strategies. As seen in FIG. 5, GPLR described in the present disclosure is several orders of magnitude better than GPGR in most cases. This is because these strategies have the same number of independent data objects, but GPLR can aggregate a much larger bandwidth for data repair. Only when the object size is very large, in which case there is not enough parallelism in repair, and the repair is bounded by brick bandwidth, do the three strategies have similar reliabilities.

Furthermore, comparing GPGR with LPLR, GPGR has much worse reliability when the object size is small, because in GPGR placement is not restricted and the system has a much larger number of independent objects. When the object size is large, GPGR has better reliability, because in this range there is still enough repair parallelism such that GPGR can fully utilize the root switch bandwidth. In comparison, in LPLR repair is limited within a cluster of size 48, and thus cannot fully utilize the leaf switch bandwidth for parallel repair.

Furthermore, GPLR as described in the present disclosure is usually better than LPLR unless the object size gets very small or very large. This means that the aggregated bandwidth in GPLR strategy plays a significant role in speeding up parallel repair, until the number of independent objects becomes too large or the parallel repair degree becomes too low such that the gain of aggregated bandwidth in repair is cancelled out.

This analysis leads to a following conclusion concerning the utilization of switch topology: in the storage system, if the object size is chosen appropriately (e.g., by grouping small objects together to form group replicas of proper sizes), randomly placing replicas uniformly among all bricks while carrying out parallel repair locally within the same switch provides by far the best data reliability.

Proactive Replication:

Another aspect of the replica placement and repair strategies that can be analyzed and evaluated by the analytical framework is proactive replication. A multinode storage system may generate replications in two different manners. The first is the so-called "reactive repair" which performs replications in reaction to a loss of a replication. Most multinode storage systems have at least this type of replication. The second is "proactive replication" which is done proactively without waiting for a loss of a replication to happen. Reactive repair and proactive replication may be designed to beneficially share available resources such as network bandwidth.

Network bandwidth is a volatile resource, meaning that free bandwidth cannot be saved for later use. Many storage applications are IO bound rather than capacity bound, leaving abundant free storage space. Proactive replication exploits such two types of free resources to improve reliability by continuously generating additional replicas besides the desired number K in the constraint of fixed allocated bandwidth. When using proactive replication together with reactive data repair strategy (i.e., a mixed repair strategy), the actual repair bandwidth consumed when failures occur is smoothed by proactive replication and thus big bursts of repair traffic can be avoided. When configured properly, the mixed strategy may achieve better reliability with a smaller bandwidth budget and extra disk space.

The analytical framework is used to study the impact of proactive replication to data reliability in the setting of GPGR strategy.

Figure 6:
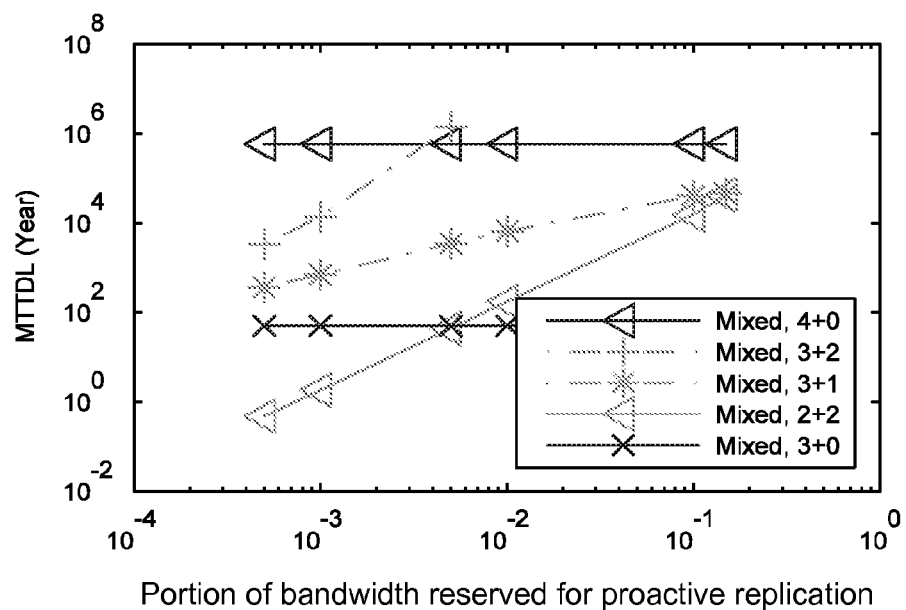
FIG. 6 shows sample results of applying the analytical framework to compare the reliability achieved by reactive repair and the reliability achieved by mixed repair with varied bandwidth budget allocated for proactive replication.

FIG. 6 shows sample results of applying the analytical framework to compare the reliability achieved by reactive repair and the reliability achieved by mixed repair with varied bandwidth budget allocated for proactive replication. It also shows different combinations of reactive replica number K and proactive replica number $K_p$. In FIG. 6, a repair strategy using K (for reactive repair) and $K_p$ for proactive repair is denoted as "K+$K_p$". For example, "3+1" denotes a mixed repair strategy having K=3 and $K_p$=1. In FIG. 6, object size is 4M. Bandwidth budget for data rebalance $p_1$=10%. The results of the comparison are discussed as follows.

First, with increasing bandwidth budget allocated for proactive replication, the reliability of mixed repair significantly improves, although still lower than pure reactive repair with same number of replicas. For example, when proactive replication bandwidth increases from 0.05% to 10%, the reliability of mixed repair with "3+1" combination improves two orders of magnitude, but is still lower than that of reactive repair with 4 replicas (by an order of magnitude). Mixed repair with "2+2" also shows similar trends.

Second, mixed repair provides the potential to dramatically improve reliability using extra disk space without spending more bandwidth budget. Comparing the mixed repair strategies "3+2" with "3+1", one sees that "3+2" has much better reliability under the same bandwidth budget for proactive replication. That is, without increasing bandwidth budget, "3+2" provides much better reliability by use some extra disk capacity. Comparing "3+2" with reactive repair "4+0", when the bandwidth budget for proactive replication is above 0.5%, "3+2" provides the same level of reliability as "4+0" (larger bandwidth budget results are not shown because the matrix I-Q* is close to singular and its inversion cannot be obtained). Therefore, by using extra disk space, it is possible to dramatically improve data reliability without incurring much burden on system bandwidth.

The Delay of Failure Detection:

The previously described exemplary model assumes that the system detects brick failure and starts repair and rebalance instantaneously. That model is referred to as Model 0. In reality, a system usually takes some time, referred to as failure detection delay, to detect brick failures. In this regard, the analytical framework may be extended to consider failure detection delay and study its impact on MTTDL. This model is referred to as Model 1.

In real systems, failure detection techniques range from simple multi-round heart-beat detection to sophisticated failure detectors. Distributions of detection delay vary in these systems. For simplicity, the following modeling and analysis assume that the detection delay obeys exponential distribution.

Figure 7:
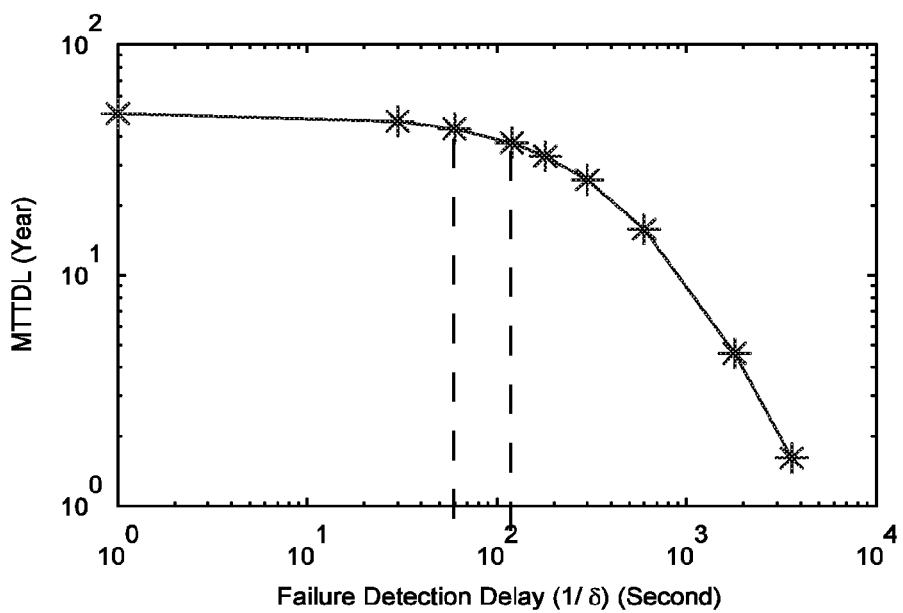
FIG. 7 shows sample reliability results of an extended model covering failure detection delay.

FIG. 7 shows sample reliability results of an extended model covering failure detection delay. A diagram of FIG. 7 shows $MTTDL_{sys}$ with respect to various mean detection delays. The result demonstrates that a failure detection delay of 60 seconds has only small impact on $MTTDL_{sys}$ (14% reduction), while a delay of 120 seconds has moderate impact (33% reduction). Such quantitative results can provide guideline on the speed of failure detection and helps the design of failure detectors.

Delay to Replace Failed Brick:

The analytical framework is further extended to cover the delay of replacing failed bricks. This model is referred to as Model 3. In the previous Model 0 and Model 1, it is assumed that there are enough empty backup bricks so that failed bricks would be replaced by these backup bricks immediately. In real operation environments, failed bricks are periodically replaced with new empty bricks. To save operational cost, the replacement period may be as long as several days. In this section, the analytical framework is used to quantify the impact of replacement delay to system reliability.

Figure 8:
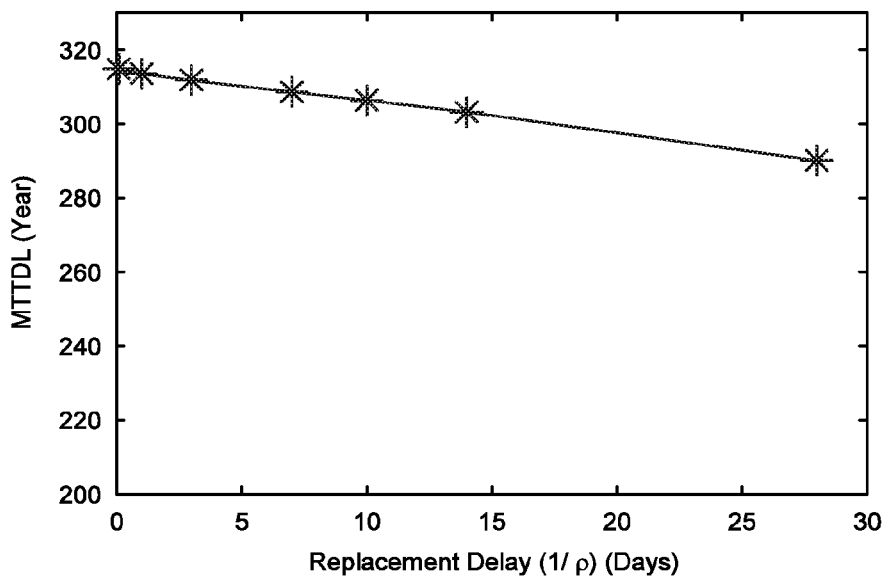
FIG. 8 shows sample computation results of impact on MTTDL by replacement delay.

FIG. 8 shows sample computation results of impact on MTTDL by replacement delay. The brick storage system studied has 512 bricks. The cutoff is adjusted to 312 at which point further decreasing cutoff does not show very strong improvement to $MTTDL_{sys}$. The results show that replacement delay from 1 day to 4 weeks does not lower the reliability significantly (only 8% drop in reliability with 4 weeks of replacement delay). This is can be explained by noting that replacement delay only slows down data rebalance but not data repair, and data repair is much more important to data reliability.

The results suggest that, in environments similar to the settings modeled herein, brick replacement frequency has a relatively minor impact on data reliability. In such circumstances, system administrators may choose a fairly long replacement delay to reduce maintenance cost, or determine the delay frequency based on other more important factors such as performance.

Conclusion

A global placement with non-global replacement strategy optimizes a storage system configuration to balance the tradeoffs between cost, performance, and reliability. Aggregated parallel use of non-root switches (leaf switches and intermediate branch switches) for repair and replacement of lost replicas of data objects is a promising strategy to improve the performance of a multinode storage system.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A storage system comprising:
    a plurality of first switches, each of the first switches connected to at least one storage cluster of storage nodes of a plurality of storage nodes, each of the storage nodes containing randomly placed replicas of data objects; and
    a second switch that connects the plurality of first switches to at least one of each other or a root switch to form a tree-like structure,
    the plurality of storage nodes to replace a lost replica of a data object by replicating a replacement replica from a source replica of the data object, and placing the replacement replica in the storage cluster that contains the source replica according to a non-global replacement policy and to replace an additional lost replica of an additional data object by replicating an additional replacement replica from an additional source replica of the additional data object in the storage cluster, and placing the additional replacement replica in the storage cluster or an additional storage cluster that is connected to the storage cluster by a switch.

2. The storage system as recited in claim 1, wherein the plurality of the storage nodes are to apply the non-global replacement policy to implement replication and replacement of additional lost replicas of corresponding data objects during an extended operation period.

3. The storage system as recited in claim 1, wherein the placing the replacement replica in the storage cluster includes placing the replacement replica randomly in a storage node of the storage cluster.

4. The storage system as recited in claim 1, wherein a switch of the storage cluster and an additional switch of the additional storage cluster are connected by a higher level switch to form a higher level cluster.

5. The storage system as recited in claim 1, wherein the storage nodes are to implement the non-global replacement policy on a percentage of lost replicas of the data objects according to a bandwidth availability of the root switch.

6. The storage system as recited in claim 5, wherein the percentage of lost replicas of the data objects replaced according to the non-global replacement policy increases as the bandwidth availability of the root switch decreases.

7. The storage system as recited in claim 1, wherein the plurality of storage nodes are to migrate one or more replicas of the data object to a newly replaced storage node.

8. The storage system as recited in claim 1, wherein the plurality of storage nodes are to proactively make extra replicas of one or more data objects.

9. The storage system as recited in claim 8, wherein the plurality of storage nodes are to consume an allocated bandwidth percentage of the root switch to proactively make the extra replicas of the one or more data objects.

10. The storage system as recited in claim 1, wherein each storage node comprises a computer having a processor, a storage device, and a network interface.

11. A computer-implemented method, comprising:
    placing replicas of data objects randomly in a plurality of storage nodes, the storage nodes being arranged in a tree-like structure that extends from a root switch to branch switches or leaf switches, each branch switch or leaf switch being connected to a plurality of storage clusters of storage nodes;
    replacing a lost replica of a data object by replicating a replacement replica from a source replica of the data object contained in a storage cluster, and placing the replacement replica in the storage cluster that contains the source replica or an additional storage cluster that is connected to the storage cluster by a switch, the replacing being performed according to a non-global replacement policy; and replacing an additional lost replica of an additional data object by replicating an additional replacement replica from an additional source replica of the additional data object in the storage cluster, and placing the additional replacement replica in the storage cluster or the additional storage cluster that is connected to the storage cluster by the switch.

12. The method as recited in claim 11, wherein the replacing the lost replica includes replacing the lost replica according to the non-global replacement policy during an extended operation period.

13. The method as recited in claim 11, wherein the placing the replacement replica includes placing the replacement replica in a random storage node of the storage cluster or the additional storage cluster.

14. The method as recited in claim 11, wherein the storage cluster is directly connected to a leaf switch.

15. The method as recited in claim 11, further comprising:
    implementing, according to a bandwidth availability of the root switch, the non-global replacement policy on a percentage of lost replicas of the data objects.

16. The method as recited in claim 11, further comprising:
    replacing a failed storage node with a new replacement storage node; and
    migrating at least one of the replicas of data objects to the new replacement storage node.

17. The method as recited in claim 11, further comprising proactively making extra replicas of one or more data objects.

18. The method as recited in claim 17, further comprising allocating a percentage of a bandwidth of the root switch for proactively making the extra replicas of the one or more data objects.

19. The method as recited in claim 11, further comprising grouping replicas of multiple data objects to form a group that is treated as a single replica by the non-global replacement policy.

* * * * *